United States Patent
Nawrocik et al.

(10) Patent No.: US 10,082,096 B2
(45) Date of Patent: Sep. 25, 2018

(54) METHOD FOR STARTING A MOTOR VEHICLE ENGINE AND ENGINE CONTROL UNIT FOR CONTROLLING A MOTOR VEHICLE ENGINE

(71) Applicant: Dr. Ing. h.c. F. Porsche Aktiengesellschaft, Stuttgart (DE)

(72) Inventors: Michal Nawrocik, Stuttgart (DE); Philipp Baisch, Tuebingen (DE); Heiko Gross, Leinfelden-Echterdingen (DE); Alexander Grau, Esslingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 126 days.

(21) Appl. No.: 15/001,271

(22) Filed: Jan. 20, 2016

(65) Prior Publication Data
US 2016/0215719 A1 Jul. 28, 2016

(30) Foreign Application Priority Data
Jan. 23, 2015 (DE) .......... 10 2015 101 005

(51) Int. Cl.
*B60T 7/12* (2006.01)
*F02D 41/06* (2006.01)
(Continued)

(52) U.S. Cl.
CPC .......... *F02D 41/062* (2013.01); *F02D 41/22* (2013.01); *F02D 41/34* (2013.01); *F02P 5/1506* (2013.01);
(Continued)

(58) Field of Classification Search
CPC ........ F02D 41/062; F02D 41/22; F02D 41/34; F02D 2200/101; F02D 2200/2012;
(Continued)

(56) References Cited

U.S. PATENT DOCUMENTS 5,101,791 A * 4/1992 Kuettner ................. F02D 41/08
  123/436
5,726,353 A * 3/1998 Matsuda ................. F16H 59/16
  180/338

(Continued)

FOREIGN PATENT DOCUMENTS

CN 1094790 A 11/1994
DE 19724921 A1 12/1998
(Continued)

*Primary Examiner* — Hung Q Nguyen
*Assistant Examiner* — Anthony Taylor, Jr.
(74) *Attorney, Agent, or Firm* — Leydig, Voit & Mayer, Ltd.

(57) ABSTRACT

A method for starting a motor vehicle engine includes measuring the profile of a rotational speed of an engine shaft of the motor vehicle engine. An estimated rotation speed of the engine shaft is determined that is expected to be present after one working cycle of the next cylinder to be fired. The estimated rotational speed is compared with a resonant rotational speed range of a vibration damper. Where the vibration damper is configured as a dual-mass flywheel and resonant vibrations occur in the vibration damper within the resonant rotational speed range. If the estimated rotational speed is within the resonant rotational speed range, at least one of introduction parameters for the introduction of a fluid to be introduced into the cylinder or an ignition time of the cylinder is changed so as to change the estimated rotational speed to be outside the resonant rotational speed range.

14 Claims, 2 Drawing Sheets

(51) Int. Cl.
    *F02D 41/22*    (2006.01)
    *F02D 41/34*    (2006.01)
    *F02P 5/15*     (2006.01)

(52) U.S. Cl.
    CPC ............ *F02D 2200/101* (2013.01); *F02D 2200/1012* (2013.01); *F02D 2250/28* (2013.01); *Y02T 10/44* (2013.01); *Y02T 10/46* (2013.01)

(58) Field of Classification Search
    CPC .... F02D 2250/28; F02P 5/1506; Y02T 10/44; Y02T 10/46
    USPC .................................................. 701/103, 104
    See application file for complete search history.

(56) References Cited

U.S. PATENT DOCUMENTS

| | | | |
|---|---|---|---|
| 7,028,657 B2 | 4/2006 | Sah et al. | |
| 7,934,485 B2 * | 5/2011 | Ota | B60W 10/06 123/350 |
| 8,392,041 B2 * | 3/2013 | Uchiyama | B60W 20/10 180/65.29 |
| 8,594,913 B2 * | 11/2013 | Steuernagel | B60K 6/48 701/1 |
| 8,985,068 B2 * | 3/2015 | Nicgorski | F01P 7/048 123/41.49 |
| 9,284,901 B2 * | 3/2016 | Dietl | F02D 41/0097 |
| 9,366,217 B2 * | 6/2016 | Crisp | F02N 11/0844 |
| 2011/0040433 A1 | 2/2011 | Steuernagel | |
| 2014/0216413 A1 * | 8/2014 | Ozawa | F02D 41/008 123/478 |
| 2014/0364273 A1 | 12/2014 | Martin | |

FOREIGN PATENT DOCUMENTS

| | | |
|---|---|---|
| DE | 69622970 T2 | 12/2002 |
| DE | 102007061730 A1 | 6/2009 |
| DE | 102011115970 A1 | 4/2013 |
| JP | 2009228538 * | 10/2009 ............ F02D 41/06 |

* cited by examiner

METHOD FOR STARTING A MOTOR VEHICLE ENGINE AND ENGINE CONTROL UNIT FOR CONTROLLING A MOTOR VEHICLE ENGINE

CROSS REFERENCE TO RELATED APPLICATIONS

Priority is claimed to German Patent Application No. DE 10 2015 101 005.4, filed Jan. 23, 2015, the entire disclosure of which is hereby incorporated by reference herein.

FIELD

The invention relates to a method for starting a motor vehicle engine and to an engine control unit for controlling a motor vehicle engine, by means of which a motor vehicle engine can be controlled during an engine start.

BACKGROUND

A motor vehicle engine which is configured as an internal combustion engine can be connected via its crankshaft to a dual-mass flywheel for damping torsional vibrations. The dual-mass flywheel has a primary mass which is connected to the crankshaft and is connected to a secondary mass via a spring, wherein the secondary mass can be coupled via a clutch to a transmission input shaft of a motor vehicle transmission. The dual-mass flywheel has a resonant frequency which is usually at a low rotational speed at which particularly high loads occur in the drive train owing to the vibration resonance.

DE 197 24 921 A1 discloses detecting the rotational speed of the crankshaft when the motor vehicle engine is started with an electric starter, and permitting the motor vehicle engine to be started only when the resonant rotational speed range of the dual-mass flywheel has been passed through.

DE 10 2011 115 970 A1 discloses analyzing the current rotational speed profile of the crankshaft below a threshold rotational speed, and in the event of resonant vibrations of the dual-mass flywheel being detected, switching off the fuel supply to the cylinders of the motor vehicle engine.

There is a continuous need to reduce the occurrence of resonant vibrations in a drive train of a motor vehicle and at the same time quickly reach an idling rotational speed when the motor vehicle engine starts.

SUMMARY

In an embodiment, the present invention provides a method for starting a motor vehicle engine including measuring the profile of a rotational speed of an engine shaft of the motor vehicle engine. An estimated rotation speed of the engine shaft is determined that is expected to be present after one working cycle of the next cylinder to be fired. The estimated rotational speed is compared with a resonant rotational speed range of a vibration damper. Where the vibration damper is configured as a dual-mass flywheel and resonant vibrations occur in the vibration damper within the resonant rotational speed range. If the estimated rotational speed is within the resonant rotational speed range, at least one of introduction parameters for the introduction of a fluid to be introduced into the cylinder or an ignition time of the cylinder is changed so as to change the estimated rotational speed to be outside the resonant rotational speed range.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
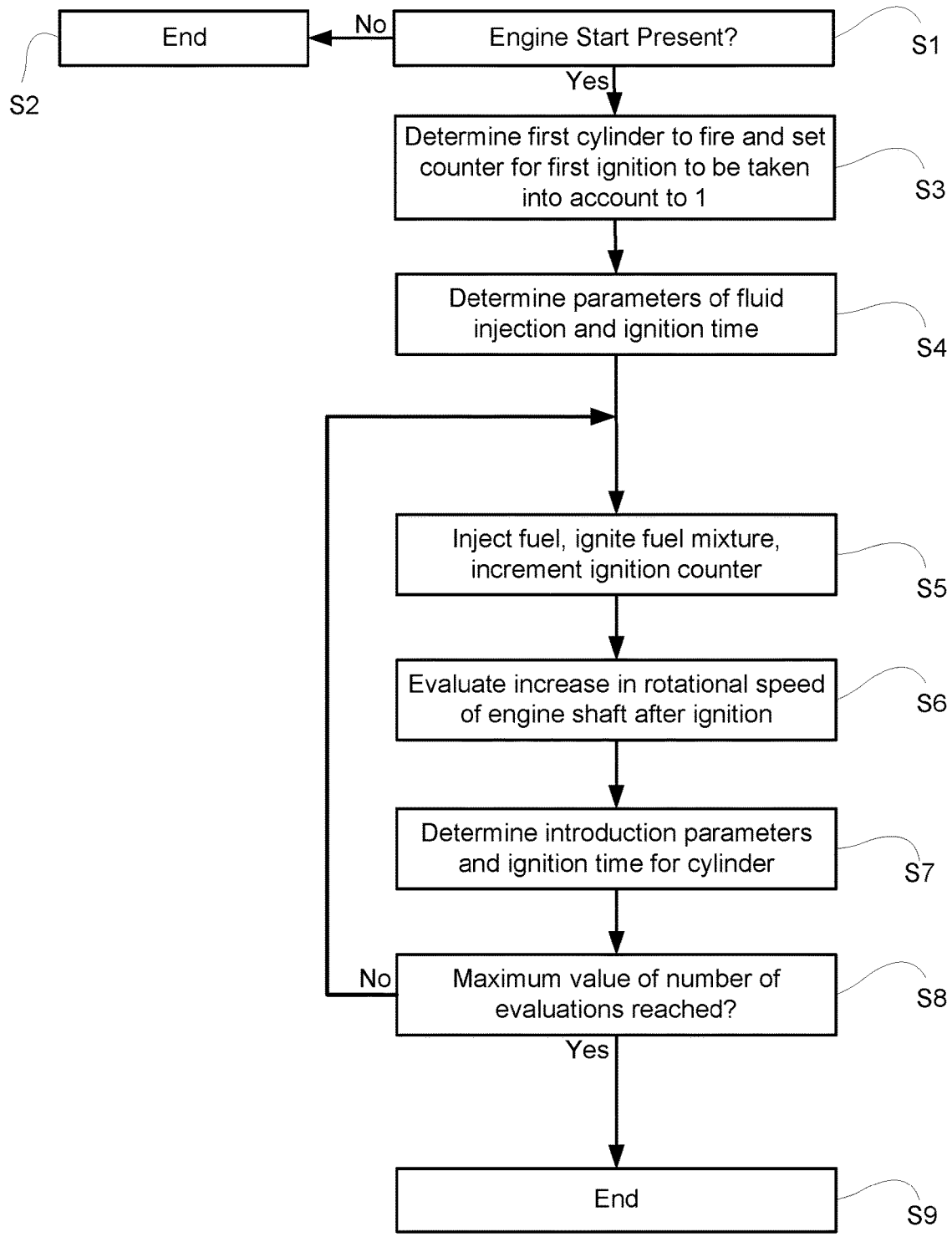
FIG. 1 shows a schematic flowchart of a method for starting a motor vehicle engine.

An aspect of the invention is to utilize measures which permit low occurrence of resonant vibrations in a drive train of a motor vehicle and at the same time a rapidly reachable idling rotational speed when the motor vehicle engine starts.

According to an embodiment of the invention, a method for starting a motor vehicle engine is provided, comprising the steps: measuring the profile of a rotational speed of an engine shaft of the motor vehicle engine, determining of an estimated rotational speed of the engine shaft which is expected to be present after one working cycle in a cylinder of the motor vehicle engine which is the next to be fired, comparing the estimated rotational speed with a resonant rotational speed range of a vibration damper, which is configured in particular as a dual-mass flywheel, wherein resonant vibrations occur in the vibration damper within the resonant rotational speed range, and in the event of the estimated rotational speed being within the resonant rotational speed range, changing introduction parameters for the introduction, in particular induction and/or injection, of a fluid to be introduced, in particular fuel and/or a fuel/air mixture, into the cylinder and/or changing an ignition time of the cylinder with the result that after the changing the estimated rotational speed which is to be expected then with the injection parameters which have been set at that time for the cylinder and the ignition time which has been set at that time is outside the resonant rotational speed range.

During the starting phase of the motor vehicle engine, in particular before the idling rotational speed is reached, the rotational speed of the engine shaft passes through the resonant rotational speed range. In this context it is desirable if the resonant rotational speed range is passed through as quickly as possible. As a result of the determination of the rotational speed profile of the engine shaft which is carried out sufficiently high sampling rate, the rotational speed profile can easily be divided into a rotational speed profile of a rated rotational speed which essentially increases continuously and vibrations which oscillate about the rated rotational speed. The oscillating vibrations can be caused by the engine orders of the motor vehicle engine and by the irregularities caused by the engine-related combustion in the cylinders. As a result it is easily possible to predict an estimated rotational speed of the engine shaft in the near future on the basis of the already measured rotational speed profile of the engine shaft. In addition, use is made of the realization that in a working cycle of the cylinder the acceleration of the engine shaft can be at a maximum and the rotational speed changes particularly strongly, while at the dead points on the cylinder during the cycle change the rotational speed is essentially virtually unchanged. By virtue of the method it is possible to ensure that at the end of the working cycle, when the rotational speed changes to a lesser degree or hardly changes at all, the rotational speed lies outside the resonant rotational speed range. If the resonant rotational speed range is passed through, the current rotational speed at the start of the working cycle can lie just before or about the lower edge of the resonant rotational speed range, with the result that during the working cycle, when the acceleration of the engine shaft can be at a maximum, the rotational speed is increased particularly strongly, with the result that after this working cycle or, if appropriate, after the smallest possible number of further working cycles, the rotational speed lies outside the resonant rotational speed range. As a result, the resonant rotational speed range can be passed through particularly quickly and/or a failed start can be avoided. In addition, as a result a particularly small amount of power is dissipated into the torsional vibration damper, with the result that a high level of efficiency of the drive train is achieved. The rotational speed at the end of the working cycle is preferably above the resonant rotational speed range. In this context it is possible, for example before the resonant rotational speed range is reached, to throttle the power of the motor vehicle engine somewhat by changing the introduction parameters and/or the ignition time, with the result that the resonant rotational speed range is just not reached and is only passed through in the subsequent working cycle. If the resonant rotational speed range is then to be passed through, it is additionally or alternatively possible to increase somewhat the power of the motor vehicle engine by changing the introduction parameters and/or the ignition time, with the result that the resonant rotational speed range can be passed through particularly quickly in one working cycle or the smallest possible number of working cycles. In this context it is not necessary to switch off the cylinders and/or to interrupt the fuel supply. Instead, during the starting process a torque can preferably be output continuously and/or without interruption by the motor vehicle engine, in order to be able to reach the idling rotational speed correspondingly quickly. By determining the estimated rotational speed by means of a prediction based on the measured rotational speed profile, it is possible to prevent the current rotational speed from staying within the resonant rotational speed range and to pass through the resonant rotational speed range quickly during the working cycle of the cylinder, with the result that a low incidence of resonant vibrations in a drive train of a motor vehicle and at the same time a rapidly reachable idling rotational speed when the motor vehicle engine starts are made possible.

The introduction parameters and/or the ignition time can be adapted, for example, by selecting a rotational speed, in particular a rotational speed which is as close as possible to the estimated rotational speed, lying just outside the resonant rotational speed range, in particular a limiting rotational speed at the edge of the resonant rotational speed range, if appropriate plus a predefined safety margin, and a cylinder power which is necessary to reach this rotational speed is calculated, and the introduction parameters and/or the ignition time for reaching this cylinder power are selected. The respective cylinder can have, in particular, electrically activated valves, with the result that the times for the opening and/or closing of the respective valve, in particular of the inlet valve, can easily be changed. Complex adaptation of a rotational position of a camshaft provided for activating the valves can therefore be avoided. In this context it is, in particular, possible for different peripheral conditions, which can lead to different mechanical power levels, to be present at different cylinders of the motor vehicle engine. Depending on the vibration behavior of the drive train and size of the predefined resonant rotational speed range it may be the case that it is not possible or not practical to pass through the resonant rotational speed range in a single working cycle. In this case, a power level which is as high as possible can be provided for the respective cylinder and, in particular, for a cylinder which follows in the ignition sequence, with the result that the resonant rotational speed range can be passed through correspondingly quickly with more than one working cycle. The mass inertia of the drive train and the intrinsic damping associated therewith are usually sufficient to avoid dangerously high amplitudes in the resonant rotational speed range. Excess amplification of the resonant vibrations can be avoided by rapidly passing through the resonant rotational speed range.

In particular, the method is suitable for starting a motor vehicle engine of a sports car. In the case of a motor vehicle engine of a sports car which is configured as a sport engine, particularly low moments of mass inertia are desired in the drive train, with the result that the moving parts of the sport engine are also particularly lightweight. As a result of the low inertial mass and the associated low damping of the spring-mass system of the torsional vibration damper, particularly strong resonant vibrations are possible and these can be avoided by means of the method. In particular in a four cylinder engine and the ignition interval of approximately 180° which results from this a large oscillation angle can occur in the torsional vibration damper and can give rise to a high amplitude of the resonant vibrations. Even in the case of low intrinsic damping, resonant vibrations can be avoided, with the result that a drive train for a sports car with a comfortable and low-stress starting behavior, a high acceleration capability and a high level of efficiency is made possible.

In particular, the determination of the estimated rotational speed and the changing of the introduction parameters and/or of the ignition time, which take place if necessary occur after the last working cycle of the cylinder, in particular during the expulsion cycle. As a result, the estimated rotational speed for the next working cycle can be determined in a time period in which valves have not yet been set in order to perform induction or injection of fuel, air and/or a fuel/air mixture. If it becomes apparent during the determination of the estimated rotational speed that the introduction parameters and/or the ignition time are to be changed, the corresponding change can still be taken into account in good time for the next working cycle. This makes it unnecessary to have to determine the estimated value for the next but one working cycle.

The determination of the estimated rotational speed preferably occurs by means of extrapolation of the rotational speed profile, wherein, in particular, at least one time period of the rotational speed profile which comprises the last four cycles of the cylinder is taken into account for the extrapolation of the rotational speed profile. As a result, the influence of the other cylinders and the resulting acceleration of the engine shaft can be taken into account in the determination of the estimated value. Compared to a purely linear extrapolation of the rated rotational speed, the accuracy of the estimated value can be improved.

When the introduction parameters are changed, an introduction starting time, an introduction end time, an introduction period, an introduction quantity of the introduction fluid and/or a composition of the introduction fluid which is to be introduced, in particular a fuel/air ratio, are/is particularly preferably changed. As a result, the mechanical power which is generated by the cylinder can be easily adapted and decreased or increased depending on the situation, in order to be able to pass rapidly through the resonant rotational speed range.

In particular, at least two different cylinders, preferably all the cylinders, of the motor vehicle engine are examined.

That is to say the method is not applied analogously in just one cylinder but rather analogously in all the cylinders. As a result this makes it possible to reliably avoid a situation in which although the rotational speed is prevented from staying in the resonant rotational speed range at the one cylinder, it is not at another cylinder.

A starting signal for starting the motor vehicle engine is preferably detected, and subsequently the cylinder which is to be fired first of all is determined, wherein the cylinder which is to be fired first of all is examined first. If the starting signal occurs, the engine shaft is firstly accelerated by an electric starter. In this time period, it is possible, by measuring the profile of the rotational speed and the angular position of the engine shaft to determine which cylinder is started first and which cylinder is examined first in the method. Subsequent cylinders which are to be examined, where appropriate, by the method result automatically from the ignition sequence of the cylinders. In this context, it is additionally possible to take into account that before the ignition of the cylinders on the basis of the extrapolation of the rotational speed profile caused by the electric starter essentially no valid estimated values which are sufficiently precise can be extrapolated for the respective cylinders.

The method is particularly preferably ended after a predefined maximum number of cycle passes of the cylinder and/or a predefined maximum number of examined cylinders. Even if the resonant rotational speed range should actually be passed through, the method can still remain active in order to prevent the rotational speed remaining in the resonant rotational speed range in the event of the rotational speed profile dropping on a local basis, for example during a compression cycle and/or an ignition misfire of a cylinder. However, when the predefined maximum number is reached the resonant rotational speed range can be passed through reliably, with the result that the method can be deactivated even if the idling rotational speed has not yet been reached.

In particular, the method is started only after a starting signal for starting the motor vehicle engine has been detected. The method and computational expenditure associated therewith is therefore applied only after a start of the motor vehicle engine, for example in the case of a cold start, in the case of a warm start and/or from a start/stop situation. In addition, this makes it possible to prevent the method unintentionally replacing another engine control strategy during the normal operation of the motor vehicle engine.

The invention also relates to an engine control unit for controlling a motor vehicle engine, in particular for carrying out the method, which engine control unit can be embodied and developed as described above, having a measuring device for measuring the profile of a rotational speed of an engine shaft of the motor vehicle engine, a computing unit for determining an estimated rotational speed of the engine shaft which is expected to be present after one working cycle in a cylinder of the motor vehicle engine which is the next to be fired, a comparator unit for comparing the estimated rotational speed with a resonant rotational speed range of a vibration damper, configured, in particular, as a dual-mass flywheel, wherein resonant vibrations in the vibration damper occur within the resonant rotational speed range, and a control unit for changing the introduction parameters for the introduction, in particular induction and/or injection, of a fluid to be introduced, in particular fuel and/or a fuel/air mixture, into the cylinder and/or changing an ignition time of the cylinder, with the result that after the changing the estimated rotational speed which is to be expected then with the injection parameters which have been set at that time for the cylinder and the ignition time which has been set at that time is outside the resonant rotational speed range, in the event of the estimated rotational speed being within the resonant rotational speed range. By determining the estimated rotational speed by means of a prediction based on the measured rotational speed profile in the engine control unit, the current rotational speed can be prevented from staying within the resonant rotational speed range, and rapid passage through the resonant rotational speed range can be achieved during the working cycle of the cylinder with the result that a low incidence of resonant vibrations in a drive train of a motor vehicle and at the same time a rapidly reachable idling rotational speed are made possible when the motor vehicle engine starts.

The invention also relates to a motor vehicle engine for driving a motor vehicle, having an engine shaft for conducting out a torque, at least one cylinder, in particular four cylinders, for generating the torque, to be conducted out via the engine shaft, by burning an introduced fluid, and an engine control unit which can be embodied and developed as described above, for influencing the introduction parameters and/or the ignition time for the respective cylinder as a function of a rotational speed profile of the engine shaft. By determining the estimated rotational speed by means of a prediction based on the measured rotational speed profile in the engine control unit, the current rotational speed can be prevented from staying within the resonant rotational speed range and rapid passage through the resonant rotational speed range during the working cycle of the cylinder can be achieved, with the result that a low incidence of resonant vibrations in a drive train of a motor vehicle and at the same time a rapidly reachable idling rotational speed are made possible when the motor vehicle engine starts.

In the method illustrated in FIG. 1, in a first step S1 it is checked whether an engine start is at all present. If this is not the case, the method is ended in a second step S2 or not even started at all. If an engine start is present, in a third step S3 the first cylinder to be fired is determined and a counter for the first ignition to be taken into account in the cylinder is set to 1. A value which is, if appropriate, also stored, from a previous application of the method can be overwritten here. In a fourth step, S4, the parameters for the introduction, in particular injection, of an introduction fluid are set and the ignition time is defined. In this context, the values may be, in particular, the standard values which are usually present, with the result that different values which are still stored can be overwritten. For example, as a result the parameters which are relevant for the combustion in the cylinder can be initialized.

In a fifth step S5, a fuel is injected, and the fuel mixture in the cylinder is ignited. In this context, the counter is incremented in order to be able to determine how many ignitions have taken place in the cylinder since the engine started. Subsequently, in a sixth step S6 the increase in the rotational speed of the engine shaft of the motor vehicle engine is evaluated after the ignition has taken place in the cylinder. As a result, the influence of the working cycle of the cylinder on the rotational speed profile can be determined, and an estimated rotational speed, which the cylinder is expected to reach at the next combustion at the end of the working cycle can be determined. In a seventh step S7, the introduction parameters and the ignition time for the cylinder under consideration can then be determined, wherein in this context the estimated value which can be determined as a function of the value of the counter and of the previously evaluated increase in the rotational speed as a result of the working cycle of the cylinder is taken into account. If necessary, this can bring about a change in the stored values. If the current rotational speed is sufficiently far away from a resonant rotational speed range, it is possible that no change is made to the set values. Subsequently, in an eighth step S8 it is checked whether a maximum number of evaluations of the cylinder is reached, that is to say the counter has reached its predefined maximum value. If this is not the case, the method is continued with the fifth step S5 and the corresponding steps S5, S6, S7, S8 are repeated until the maximum value is reached. If the maximum value is reached, the method is ended in a ninth step S9.

Figure 2:
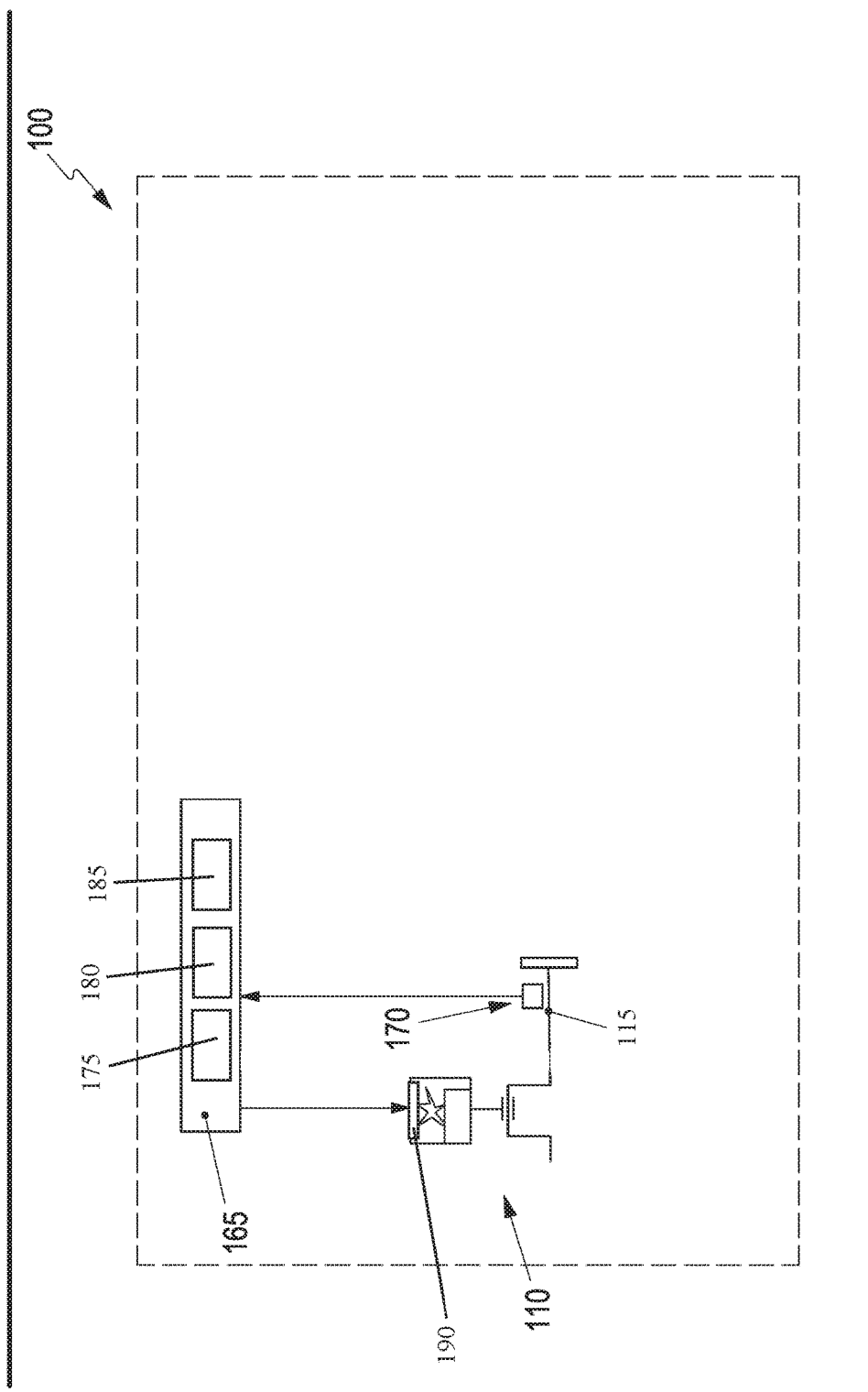

FIG. 2 shows a motor vehicle 100 having an internal combustion engine 110 with multiple cylinders each having one or more electrically activated valves 190, and an engine output shaft 115. The internal combustion engine 110 is controlled by an engine controller 165. A rotational speed of the drive output shaft 115 can be determined a measuring device, i.e. sensor 170. The engine controller 165 includes a computing unit, i.e. computer 175, for determining an estimated rotational speed of the engine shaft which is expected to be present. The engine controller 165 additionally includes a comparator unit, i.e. a comparator 180, for comparing the estimated rotational speed with a resonant rotational speed range of a vibration damper configured as a dual-mass flywheel, wherein resonant vibrations in the vibration damper occur within the resonant rotational speed range. The engine controller 165 also includes a control unit, i.e. cylinder controller 185, for changing at least one of introduction parameters for the introduction of a fluid to be introduced into the cylinder or an ignition time of the cylinder so as to change the estimated rotational speed to be outside the resonant rotational speed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for starting a motor vehicle engine, comprising:
    measuring a profile of a rotational speed of an engine shaft of the motor vehicle engine over a time period that includes multiple previous working cycles of a cylinder of the motor vehicle engine, wherein measuring the profile of the rotational speed of the engine shaft of the motor vehicle includes, for each of the multiple previous working cycles of the cylinder, determining a rotational speed increase of the engine shaft and a value of an ignition counter,
    determining, by extrapolating the profile of the rotational speed of the engine shaft of the motor vehicle for a future working cycle of the cylinder, an estimated rotational speed of the engine shaft that is expected to be present after the future working cycle of the cylinder takes place,
    comparing the estimated rotational speed with a resonant rotational speed range of a vibration damper, the vibration damper being configured as a dual-mass flywheel, wherein resonant vibrations occur in the vibration damper within the resonant rotational speed range, and
    if the estimated rotational speed is within the resonant rotational speed range, changing at least one of introduction parameters for a fluid to be introduced into the cylinder or an ignition time of the cylinder, by selecting a rotational speed lying outside the resonant rotational speed range which is close to the estimated rotational speed, calculating a cylinder power necessary to reach the selected rotational speed, and adjusting an opening or a closing timing of at least one electrically actuated valve so as to change the estimated rotational speed to be outside the resonant rotational speed range.

2. The method as recited in claim 1, wherein the fluid to be introduced is a fuel or a fuel/air mixture, and
    wherein the introduction of the fluid is by at least one of induction or injection.

3. The method as recited in claim 1, wherein the determination of the estimated rotational speed and the changing of the introduction parameters and/or of the ignition time, which take place if necessary, occur after a last working cycle of the cylinder.

4. The method as recited in claim 3, wherein the determination of the estimated rotational speed and the changing of the introduction parameters and/or of the ignition time, which take place if necessary, occur during an expulsion cycle after the last working cycle of the cylinder.

5. The method as recited in claim 1, wherein the time period that includes multiple previous working cycles of a cylinder includes at least four previous working cycles of the cylinder.

6. The method as recited in claim 1, wherein when the introduction parameters are changed, at least one of an introduction starting time, an introduction end time, an introduction period, an introduction quantity of the introduction fluid or a composition of the introduction fluid which is to be introduced is changed.

7. The method as recited in claim 1, wherein at least two different cylinders of the motor vehicle engine are examined.

8. The method as recited in claim 1, wherein a starting signal for starting the motor vehicle engine is detected, and subsequently the cylinder which is to be fired first of all is determined, wherein the cylinder which is to be fired first of all is examined first.

9. The method as recited in claim 1, wherein the method is ended after a predefined maximum number of cycle passes of the cylinder and/or a predefined maximum number of examined cylinders.

10. The method as recited in claim 1, wherein the method is started only after a starting signal for starting the motor vehicle engine has been detected.

11. An engine controller for controlling a motor vehicle engine, comprising:

a sensor configured to measure a profile of a rotational speed of an engine shaft of the motor vehicle engine over a time period that includes multiple previous working cycles of a cylinder of the motor vehicle engine, wherein measuring the profile of the rotational speed of the engine shaft of the motor vehicle includes, for each of the multiple previous working cycles of the cylinder, determining a rotational speed increase of the engine shaft and a value of an ignition counter;

a computer programmed to determine, by extrapolating the profile of the rotational speed of the engine shaft of the motor vehicle for a future working cycle of the cylinder, an estimated rotational speed of the engine shaft which is expected to be present after the future working cycle of the cylinder takes place;

a comparator programmed to compare the estimated rotational speed with a resonant rotational speed range of a vibration damper configured as a dual-mass flywheel, wherein resonant vibrations in the vibration damper occur within the resonant rotational speed range; and a cylinder controller programmed to, if the estimated rotational speed is within the resonant rotational speed range, change at least one of introduction parameters for a fluid to be introduced into the cylinder or an ignition time of the cylinder, by selecting a rotational speed lying outside the resonant rotational speed range which is close to the estimated rotational speed, calculating a cylinder power necessary to reach the selected rotational speed, and adjusting an opening or a closing timing of at least one electrically actuated valve so as to change the estimated rotational speed to be outside the resonant rotational speed range.

12. A motor vehicle engine for driving a motor vehicle, comprising:

an engine shaft configured to output a torque;

at least one cylinder configured to generate the torque by burning an introduced fluid; and an engine controller configured to influence at least one of introduction parameters for the introduced fluid or an ignition time for the at least one cylinder as a function of a rotational speed profile of the engine shaft, the engine controller including:

a sensor configured to measure a profile of a rotational speed of the engine shaft of the motor vehicle engine over a time period that includes multiple previous working cycles of the at least one cylinder of the motor vehicle engine, wherein measuring the profile of the rotational speed of the engine shaft of the motor vehicle includes, for each of the multiple previous working cycles of the at least one cylinder, determining a rotational speed increase of the engine shaft and a value of an ignition counter;

a computer programmed to determine, by extrapolating the profile of the rotational speed of the engine shaft of the motor vehicle for a future working cycle of the at least one cylinder, an estimated rotational speed of the engine shaft which is expected to be present after the future working cycle of the at least one cylinder takes place;

a comparator programmed to compare the estimated rotational speed with a resonant rotational speed range of a vibration damper configured as a dual-mass flywheel, wherein resonant vibrations in the vibration damper occur within the resonant rotational speed range; and a cylinder controller programmed to, if the estimated rotational speed is within the resonant rotational speed range, change at least one of introduction parameters for the fluid to be introduced into the at least one cylinder or the ignition time of the at least one cylinder, by selecting a rotational speed lying outside the resonant rotational speed range which is close to the estimated rotational speed, calculating a cylinder power necessary to reach the selected rotational speed, and adjusting an opening or a closing timing of at least one electrically actuated valve so as to change the estimated rotational speed to be outside the resonant rotational speed range.

13. The motor vehicle engine as recited in claim 12, wherein the at least one cylinder includes four cylinders.

14. The method as recited in claim 1, further comprising initializing the value of the ignition counter to 1 for a first ignition to be taken into account in the cylinder after determining that an engine start is present.

* * * * *